(12) United States Patent
Brooks

(10) Patent No.: US 6,988,432 B2
(45) Date of Patent: Jan. 24, 2006

(54) MULTI-TIERED-RECESS SCREWS

(75) Inventor: Laurence Antony Brooks, Sheffield (GB)

(73) Assignee: Uniscrew Worldwide, Inc., Knoxville, TN (US)

( * ) Notice: Subject to any disclaimer, the term of this patent is extended or adjusted under 35 U.S.C. 154(b) by 36 days.

(21) Appl. No.: 10/703,115

(22) Filed: Nov. 6, 2003

(65) Prior Publication Data

US 2005/0098000 A1 May 12, 2005

(51) Int. Cl.
*B25B 23/00* (2006.01)
(52) U.S. Cl. .......................... 81/439; 81/441; 411/403; 411/407; 411/410
(58) Field of Classification Search .............. 81/439, 81/441, 460, 461; 411/403, 404, 407, 408, 411/410
See application file for complete search history.

(56) References Cited

U.S. PATENT DOCUMENTS

| | | | | |
|---|---|---|---|---|
| 3,127,798 A | * | 4/1964 | Gol ............................. | 81/439 |
| 4,187,892 A | * | 2/1980 | Simmons ...................... | 81/441 |
| 4,258,596 A | * | 3/1981 | Bisbing et al. ............... | 81/436 |
| 4,955,936 A | * | 9/1990 | Douglas ....................... | 81/441 |
| 5,870,934 A | * | 2/1999 | Cullinan ....................... | 81/436 |
| 6,792,838 B2 | * | 9/2004 | Brooks et al. ................ | 81/439 |
| 6,813,978 B1 | * | 11/2004 | Karpp .......................... | 81/437 |
| 2003/0053887 A1 | * | 3/2003 | Brooks ........................ | 411/403 |

FOREIGN PATENT DOCUMENTS

| | | |
|---|---|---|
| GB | 1150382 | 4/1969 |
| GB | 2285940 A | 8/1995 |
| GB | 2329947 A | 4/1999 |
| WO | WO 0177538 A1 | 10/2001 |
| WO | WO 03025403 A2 | 3/2003 |

* cited by examiner

*Primary Examiner*—Debra S Meislin
(74) *Attorney, Agent, or Firm*—Luedeka, Neely & Graham, PC

(57) ABSTRACT

A screw and driver system includes a range of screws and a driver. Each screw has a head having a driving recess in its surface for engagement by the driver. The recess of larger screws in the range have a plurality of superimposed recess tiers of decreasing size with increasing depth from said surface. Each tier has substantially parallel driving surfaces and torque applied to the driver is transmitted to the screw through the driving surfaces. At least one tier of at least smaller screws in the range has a rib. Engagement of the driver with the recess causes deformation of rib, and hence creation of an interference fit of the driver in the recess.

16 Claims, 3 Drawing Sheets

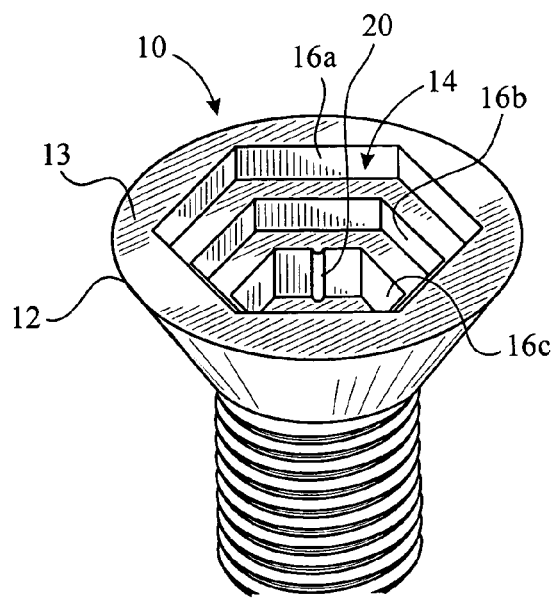
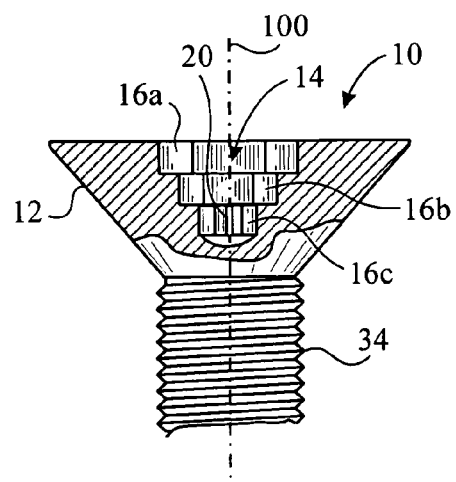
Fig. 1a    Fig. 1b
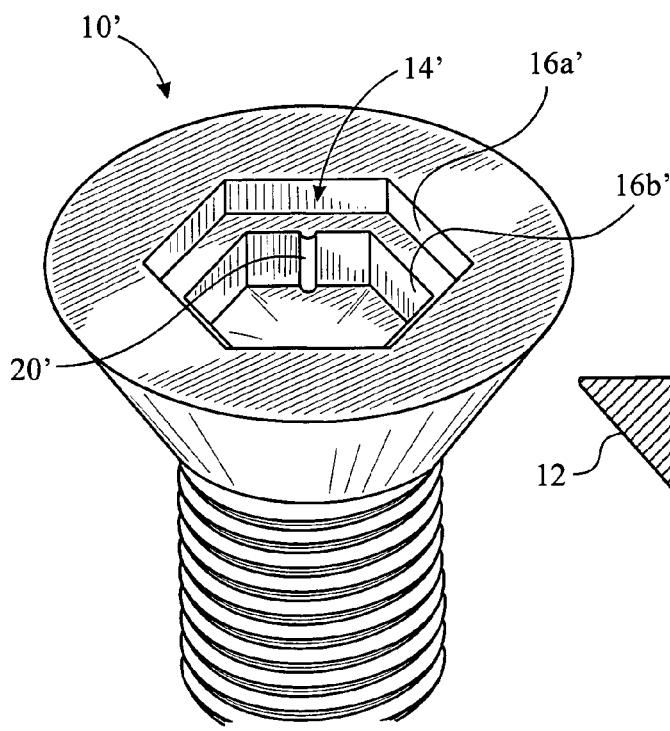
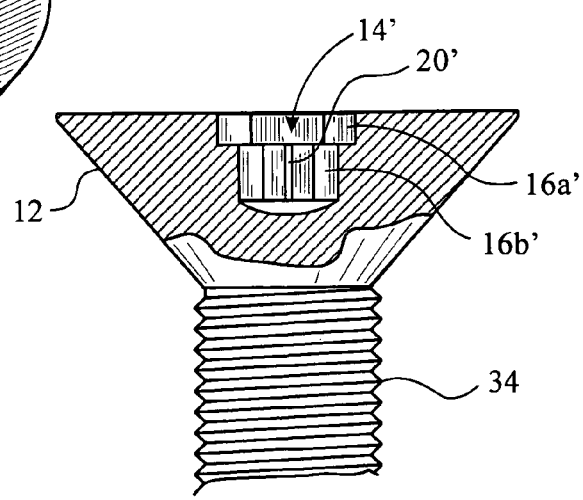
Fig. 2a    Fig. 2b

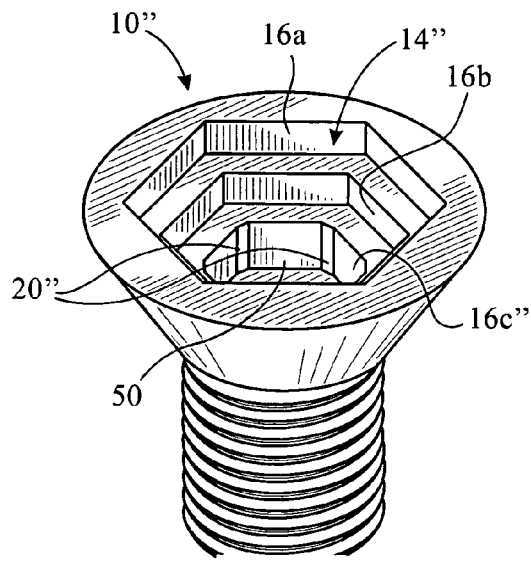
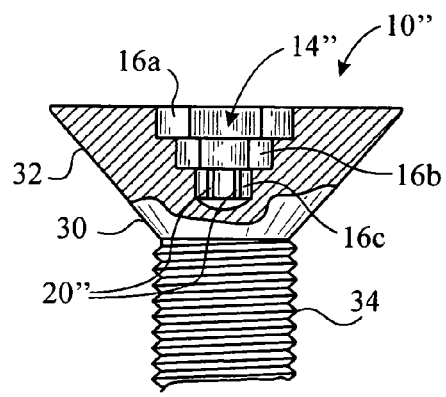
Fig. 5a            Fig. 5b
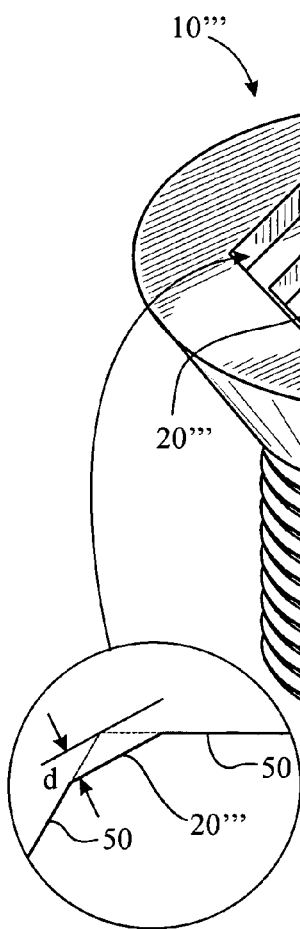
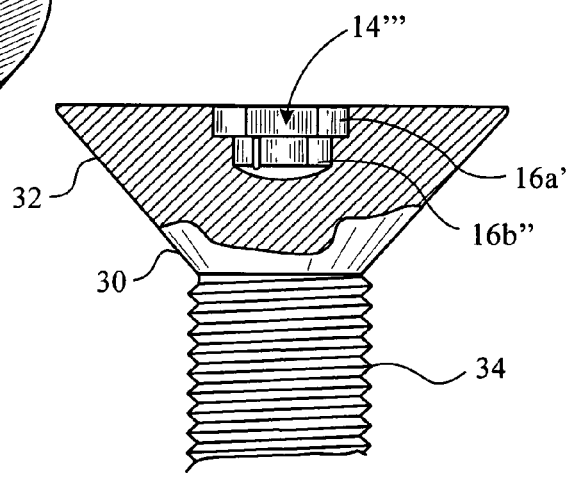
Fig. 6a            Fig. 6b

MULTI-TIERED-RECESS SCREWS

FIELD OF THE INVENTION

This invention relates generally to screws and drivers for screws. More particularly, the invention relates to multi-tiered-recess screws and driver therefore.

BACKGROUND OF THE INVENTION

Multi-tiered-recess screws typically include a driving recess for insertion of a driving tool, which recess includes a plurality of superimposed recess tiers of decreasing size. The tiers may be concentric, in which event they are non circular. The invention is particularly concerned with the latter, because these have the additional feature that, whereas the driver has a fixed number of tiers, the screw may have some or all of the tiers, depending on its size and torque driving requirements.

It is a particular feature of this kind of screw that there is a single driver that is suitable for driving a range of sizes of screw. Smaller screws simply have one or two small recesses, while the larger screws have larger recesses also.

GB-A-1150382 appears to be the first disclosure of a screw provided with a multi-tiered recess and a corresponding multi-tiered driver. GB-A-2285940 discloses essentially the same idea. Both these publications describe the advantages provided by the arrangements disclosed. The first is that the recesses are essentially parallel-sided and consequently eliminate cam-out problems that are associated with cross-head recesses. Secondly, they give the possibility of a single driving tool being suitable for driving a wide range of screw sizes.

The single driving tool typically has three (for example) tiers of driving surfaces which are employed to drive large screws having three tiers of recess. However, the same tool can be employed with smaller screws having only two tiers of recess, the largest tier being omitted. Indeed, even smaller screws may have only one, the smallest tier, in their recess and be driven by the smallest tier only of the tool.

GB-A-2329947 discloses a similar arrangement, and WO-A-0177538 discloses tiers that have such a small extent in the recesses of screws and bolts that, at the torques at which the screws are intended to be operated, they cannot be turned unless at least two tiers are both engaged by the tool. Otherwise, the screw is arranged to round out of engagement with the driving tool. This provides a security feature in that only the appropriate tool will undo the screw.

WO03/025403 discloses a method of manufacture of such screws using cold forming punches. It is possible to make the recesses with some precision, so that the driving tool is a close fit in the recess. This has the very useful feature that tiers can be shallow. Then, screw heads do not need to be large to accommodate the driving tool. Yet, adequate torque can still be applied because a large proportion of the area of each recess is used for torque transmission by virtue of the close tolerance fit. But, equally usefully, the tool fits the screw so closely that, once mated with the driving tool, the screw can be carried solely by the driver when it is offered up to a workpiece. Indeed, with self-tapping wood screws, the connection between driver and screw is so stable that some pressing and simultaneous rotation forces can be applied to the tool, without holding the screw. This can be done without significant risk that the connection will fold as frequently happens, unless forces are maintained absolutely axial. It cannot be done at all with, for example, slotted screws. This feature is almost without limitation. Certainly, with three-tiered screws, such as those available under the trademark UNI-SCREW, the fit is so close that even carrying screws dangling vertically from the driver still fail to fall off if carried carefully.

Nevertheless, it would be desirable to improve this "stick-fit" feature. This is particularly so with screws having only one or two tiers of recess. The smallest recess is not quite such a close fit, and it seems that it is partly the plurality of tiers that, at least to some extent, explains why the screw appears to grip the driver so effectively. So, with smaller screws having just one tier of recess the stick-fit feature is not so evident. It is an object of the present invention to improve the stick-fit feature of screws to which this patent application relates.

SUMMARY OF THE INVENTION

In accordance with this invention there is provided a screw and driver system including a range of screws and a driver for the range, each screw including a head having a driving recess in its surface for engagement by the driver and a longitudinal axis, in which the recess of larger screws in the range have a plurality of superimposed recess tiers of decreasing size with increasing depth from the surface, each tier having substantially parallel driving surfaces substantially parallel the longitudinal axis, and in which the driver and recess are shaped so that, when the driver is engaged with the recess of any screw in the range, torque applied to the driver is transmitted to the screw through the driving surfaces; wherein, at least one tier of at least smaller screws in the range has a rib parallel the longitudinal axis and encroaching into the space of the recess tier occupied by the driver when it is engaged with the recess, whereby engagement of the driver with the recess causes deformation of the rib and hence creation of an interference fit of the driver in the recess.

Preferably, the recess tiers of the larger screws are non-circular polygons in section. The polygons may be concentric. They may be the same polygons. They may be angularly offset with respect to one another. The smaller screws in the range may have only one tier in their recess.

Preferably all the screws in the range have the rib. The rib may be in a tier which is common to all screws in the range. Alternatively, the rib may be in the single tier of single tier screws, and a different tier in screws having a plurality of tiers.

The invention also provides a screw that fits in the range of screws in the system, which screw includes a recess tier having the rib.

Screws in accordance with the present invention are conveniently made by a cold forming process in which the recess is formed by a punch of corresponding shape to the recess being formed. Preferably, the recess rib is formed by a groove formed in the flank of the punch.

Preferably, the rib is the full depth of only one tier, where there are multiple tiers.

One advantage of the present invention is that the rib can be large enough to ensure an interference fit with the driver but, when it is only in one tier, it does not increase substantially the overall force required to engage the driver with the recess, particularly not on larger screws.

Preferably, it is the smallest tier in each screw of the range that is provided with the rib. Indeed, it is on larger screws that the dimensions of the smallest tier are most susceptible to fluctuation in dimensional tolerance.

Where the tiers of the recess are polygonal in section having several flanks, the rib may be central in one flank.

Alternatively, and this is preferred, the rib may be in a corner between two flanks. This has the advantage that a sharp corner of the driving tool bites into the rib more easily than the rib simply being flattened by the flank of the tool. Indeed, a smaller rib is preferably provided in each corner between the flanks of the recess tier. This maintains the central location of the driving tool in the recess.

BRIEF DESCRIPTION OF THE DRAWINGS

Embodiments of the present invention are further described hereinafter, by way of example only, with reference to the accompanying drawings, in which:

FIGS. 1A and B are a perspective view and side view, partly in section, of a screw in accordance with the present invention;

FIGS. 2A and B are similar views to FIG. 1, but of a different screw in accordance with the present invention;

FIGS. 5A and 5B are similar views to FIGS. 1A and 1B of a different embodiment of the present invention; and FIGS. 6A and 6B are similar views to FIGS. 2A and 2B of another different embodiment of the present invention.

DETAILED DESCRIPTION OF PREFERRED EMBODIMENTS

Figure 3A:
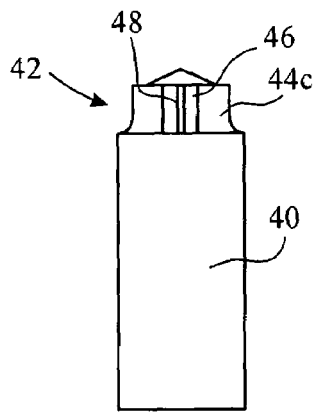
FIGS. 3A, B and C are two side views and an end view in the direction of arrow C in FIG. 3B, respectively, of two punches to produce screws in accordance with the present invention.

In FIGS. 1A and B, a screw 10 has a recess 14 in its head 12 which opens from the top surface 13 of the head 12. The recess 14 preferably includes three super imposed hexagonal recesses 16A, B, C, each of reducing dimension. The bottom recess 16C includes a rib 20.

Figure 4:
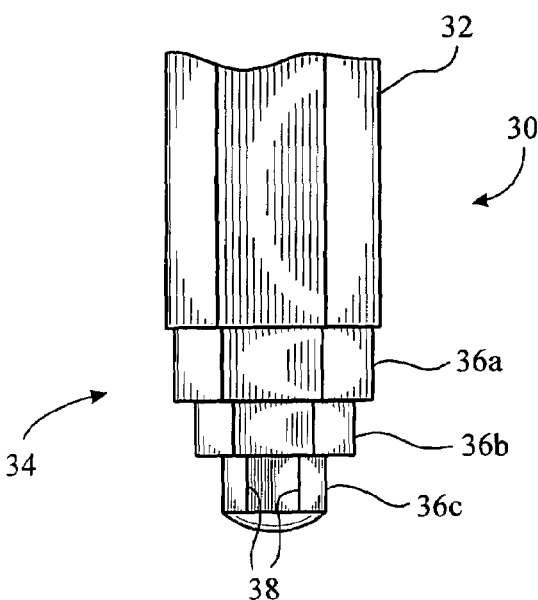
FIG. 4 is a side view of a driver in accordance with the present invention.

Turning to FIG. 4, a driver 30 includes a shaft 32 and a driving tip 34 including three tiers 36A, B, C. The cross sections of the driving tiers 36A, B, C correspond with the cross sections of the recesses 16A, B, C of the screw 10. However, the rib 20 intrudes into the space occupied by the tier 36C of the driver 30 when the driver is engaged with the screw 10. Accordingly, when the driver 30 is inserted into the recess 14, the rib 20 is deformed by the tier 36C so that an interference fit is created in which the recess tier 16C grips the tier 36C of the driver. Then, the screw 10 is firmly seated on the end of the driver 30 so that the screw can be manipulated to any position without the risk of it falling off the driver 30.

In FIG. 2A, a larger screw 10' is illustrated having a recess 14' which includes just two recess tiers 16A',B'. Here, recess 16B' is deeper than the corresponding recess of the FIG. 1 arrangement and is at least equal to the combined depths of recesses 16B,C of the FIG. 1 screw. The advantage of this arrangement is that the recess 16A' is made deeper that the corresponding recess tier of the FIG. 1 screw so that more of the tier 36A of the driver 30 is employed to drive the screw. Being a larger screw, greater torque is normally required and this is provided by the extra depth of the largest tier.

A rib 20' is provided in this screw in the recess 16B'. Whereas such a long rib might appear to potentially create an excessive quantity of material to be deformed, it should be borne in mind that only its top half would be engaged by the tier 36B of the driver 30, the bottom half of the tier recess 16B' being occupied by the smallest tier 36C of the driver 30. The reason why the bottom tier is not provided here is because the torque contribution which it would make to the recess is negligible compared with the other two recesses. Instead, it is omitted so that it does not have the opportunity to fill and prevent full insertion of the driver 30.

Figure 3C:
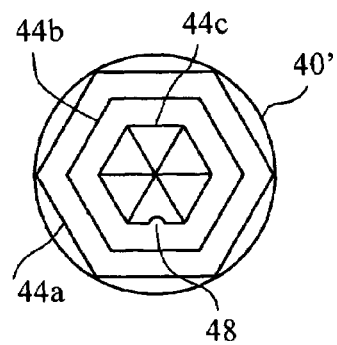
Figure 3B:
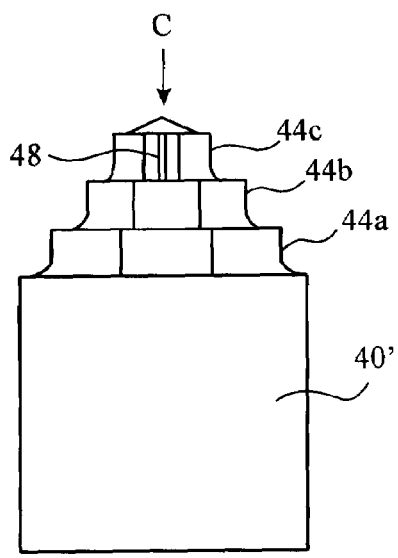

Turning to FIG. 3, in FIG. 3A is shown a punch 40 having a recess forming head 42 including a single hexagonal tier 44C. In the side of one face 46 of the tier 44C there is provided a groove 48 whose function is to form the rib 20 in the recess of a screw being worked by the punch 40. Likewise, in FIG. 3B, a punch 40' has three tiers 44A, B, C and is for forming the recess 14 of the screw shown in FIGS. 1A and B. This likewise has a groove 48 for forming the rib 20. The diameter of the groove 48 is preferably about $3.0 \times 10^{-3}$ inches in diameter (about 0.08 millimeters) and it has a depth of about half this amount.

An advantage of the present invention is that the rib 20 is only active over a small proportion of the length of engagement of a driver with a recess, at least in connection with multi tier recesses where the stick fit feature is not required to such an extent. With the smaller recesses, however, where it is more necessary in order to retain the screw on the driver, it occupies a greater proportion of the depth of the recess. Thus, in smaller screws it takes on a greater role in holding the screw in place on the driver than is required in larger screws where the multiplicity of tiers assists in this function.

In FIGS. 5A and 5B, instead of the rib being placed centrally in a flank 50 of the tier recess 16c", here, the screw 10" has a small rib 20" in each corner between adjacent flanks 50. The driving tool 34 (see FIG. 4) has sharp corners 38 between its flanks, and these cut into the ribs 20", making insertion of the tool easier. Nevertheless, there is still created the interference fit between the tool and screw.

FIGS. 6A and 6B show a modification where the single rib 20'" is placed in just one corner in the recess tier 16b". This has the same effect as the FIG. 5A arrangement, although may have the disadvantage, as does the FIGS. 1 and 2 arrangements described above, of tending to decentralise the tool when it is being inserted in the screw 10'".

The ribs 20" of the FIG. 5A arrangement are each smaller than the rib 20'" of the FIG. 6 arrangement. Because the rib 20'" is in a corner, where it will more easily be cut and spread by insertion of the tool, it can be deeper than the rib 20. Here it may be between 4 and $10 \times 10^{-3}$ inches (between 0.1 and 0.25 mm) in depth from its surface to the corner (dimension d in the inset to FIG. 6A). The ribs 20" however, will each have a depth of between about 1 and $1.5 \times 10^{-3}$ inches (0.025 and 0.05 mm).

Another advantage of the FIGS. 5A and 6A arrangements is that it is much easier to form the punches 40, 40', because here the punch simply requires a corner of its tier 44c (or all its corners on that tier in the case of the FIG. 5A arrangement) to be chamfered to the requisite degree. This avoids the problem of scoring the groove 48 in a flank of the tool.

The foregoing description of certain exemplary embodiments of the invention has been provided for purposes of illustration only, and it is understood that numerous modifications o alterations may be made in and to the illustrated embodiments without departing from the spirit and scope of the invention as defined in the following claims.

What is claimed is:

1. A screw and driver system, the system comprising a range of screws including a set of larger screws and a set of smaller screws and a driver operatively compatible with each one of the screws of the range of screws for rotatably driving the screws, each one of the screws of the range of screws comprising a head having a driving recess defined on a surface of the head for engagement by the driver and a longitudinal axis, wherein each one of the larger screws of the range of screws includes a plurality of first superimposed recess tiers of decreasing size with increasing depth from the surface of the head, each of the first superimposed recess tiers having substantially parallel driving surfaces substantially parallel to the longitudinal axis, and wherein the driver and the first superimposed recess tiers are shaped so that, when the driver is engaged with the first superimposed recess tiers, torque applied to the driver is transmitted to the screw through the driving surfaces; wherein, each of the screws of the set of smaller screws includes at least one second recess tier which includes a rib extending substantially parallel to the longitudinal axis of the screw and encroaching into a space defined by the second recess tier and which space is occupied by the driver when it is engaged with the second recess tier, whereby engagement of the driver with the second recess tier causes deformation of the rib and hence creation of an interference fit of the driver in the second recess tier.

2. A system as claimed in claim 1, wherein said first superimposed recess tiers of said larger screws are non-circular polygons in section.

3. A system as claimed in claim 2, wherein said polygons are concentric.

4. A system as claimed in claim 2, wherein said first superimposed recess tiers are the same polygons.

5. A system as claimed in claim 4, wherein each one of said first superimposed recess tiers are angularly offset with respect to one another.

6. A system as claimed in claim 2, wherein each second recess tier of the smaller screws in said range comprises a single tier.

7. A system as claimed in claim 1, wherein all the screws of the range have said rib.

8. A system as claimed in claim 7, wherein each of the ribs is in a tier which is common to all screws in the range.

9. A system as claimed in claim 7, wherein each of the ribs of ones of the screws having only a single tier is in the single tier of such single tier screws, and is located in a different tier in ones of the screws having a plurality of tiers.

10. A system as claimed in claim 9, wherein said rib is the full depth of only one tier, where there are multiple tiers, or of the tier, where there is only one tier.

11. A system as claimed in claim 2, wherein said first recess tiers of said larger screws are non-circular polygons in section and each first recess tier includes a rib extending substantially parallel to the longitudinal axis of the screw and encroaching into a space defined by the first recess tier and which space is occupied by the driver when it is engaged with the first recess tier, whereby engagement of the driver with the first recess tier causes deformation of the rib and hence creation of an interference fit of the driver in the first recess tier.

12. A system as claimed in claim 11, wherein at least one of said ribs of the first recess tiers is located in a corner between adjacent driving surfaces.

13. A system as claimed in claim 12, wherein each of the ribs of the first recess tiers is located in a corner between adjacent driving surfaces.

14. A system as claimed in claim 1, wherein it is the smallest tier in each screw of the range that is provided with said rib.

15. A screw and driver system comprising a range of screws and a driver for said range, each screw comprising a head having a driving recess in its surface for engagement by said driver and a longitudinal axis, wherein the recess of one or more of the screws in the range have a plurality of superimposed recess tiers of decreasing size with increasing depth from said surface, each tier being polygonal in section having substantially parallel driving flanks substantially parallel said longitudinal axis, and wherein said driver and recess are shaped so that, when the driver is engaged with the recess of any screw in said range, torque applied to the driver is transmitted to the screw through said driving flanks; wherein, at least one tier of one or more of the screws in said range has ribs parallel said longitudinal axis disposed in corners defined between adjacent ones of the driving flanks of the at least one tier and encroaching into the space of said recess tier occupied by said driver when it is engaged with said recess, whereby engagement of the driver with the recess having a rib causes deformation of said rib and hence creation of an interference fit of said driver in said recess.

16. A screw and driver system, the system comprising a plurality of screws and a driver operatively compatible with the screws for rotatably driving the screws, each screw comprising a head having a driving recess defined on a surface of the head for engagement by the driver and a longitudinal axis, wherein each driving recess includes a recess tier having a rib extending substantially parallel to the longitudinal axis of the screw and encroaching into a space defined by the recess tier and which space is occupied by the driver when it is engaged with the recess tier, whereby engagement of the driver with the recess tier causes deformation of the rib and hence creation of an interference fit of the driver in the recess tier, at least one of the screws having a plurality of superimposed recess tiers of decreasing size with increasing depth from the surface of the head, each of the superimposed recess tiers having substantially parallel driving surfaces substantially parallel to the longitudinal axis, and wherein the driver and the superimposed recess tiers are shaped so that, when the driver is engaged with the superimposed recess tiers of the at least one screw, torque applied to the driver is transmitted to the at least one screw through the driving surfaces; and wherein the rib of the at least one screw is defined on one of the driving surfaces of one of the plurality of the superimposed recess tiers.

* * * * *